June 26, 1934.   C. A. CAMPBELL   1,964,108
FEED VALVE FOR AIR BRAKES
Filed Jan. 18, 1932
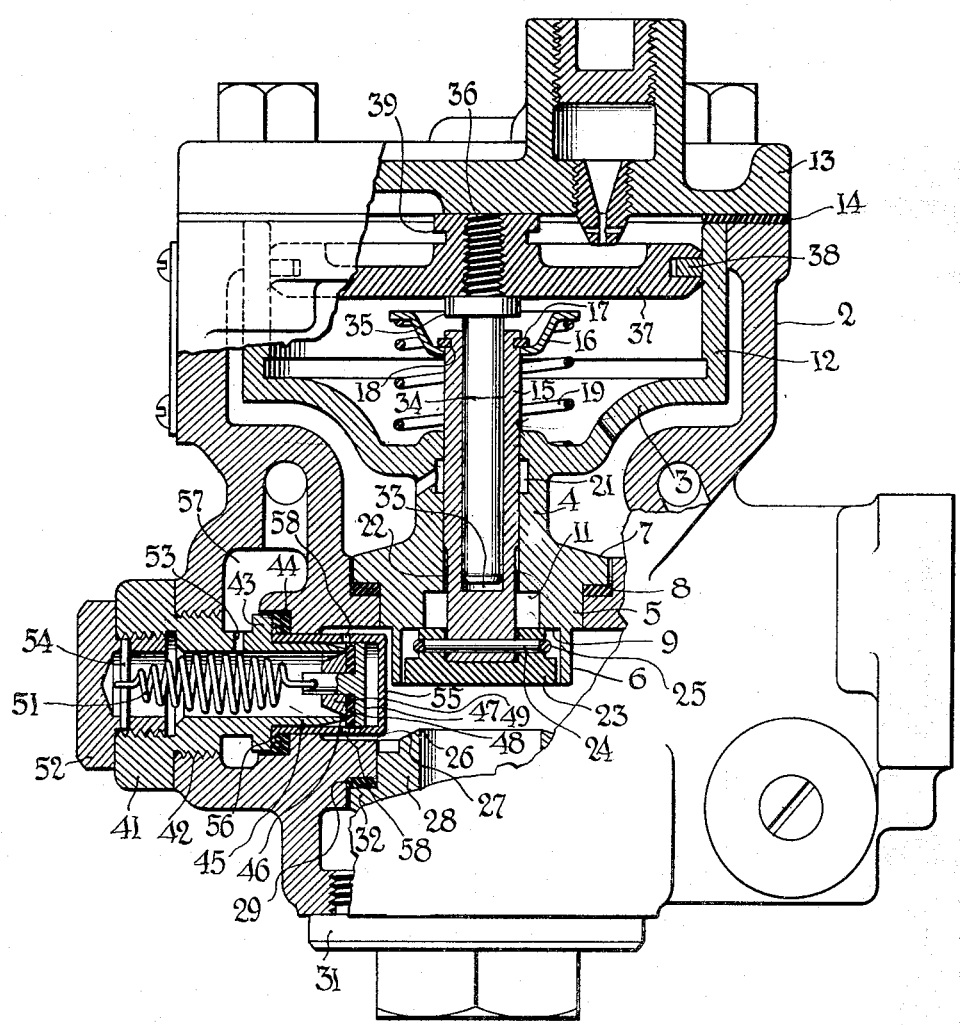
Inventor
Charles A. Campbell
By
Attorneys Patented June 26, 1934

1,964,108

UNITED STATES PATENT OFFICE 1,964,108

FEED VALVE FOR AIR BRAKES

Charles A. Campbell, Watertown, N. Y., assignor to The New York Air Brake Company, a corporation of New Jersey Application January 18, 1932, Serial No. 587,367

12 Claims. (Cl. 303—59)

This invention relates to air brakes, and particularly to the feed valve which, under the control of the engineer's brake valve, maintains the brake pipe pressure when the engineer's brake valve is in running position.

More particularly, this invention constitutes an improvement on the feed valve structure disclosed and claimed broadly in prior Patent #1,781,747, granted November 18, 1930. This improvement consists mainly in so constructing the individual working parts of the valve that they may be removed individually without disturbing the main valve assembly. Further, it is desired to so construct the parts as to minimize possibilities of faulty operation incident to the deposition of carbonized oil and to the collection of dirt in the operating parts of the valve.

The preferred embodiment of this invention is illustrated in the accompanying drawing, in which the single figure is a view, partly in section and partly in elevation, of a feed valve containing the improvements above suggested.

Referring to the drawing, the reference character 2 designates the body of a feed valve, which is cast in one piece, and the general form of which can best be understood by reference to the drawing. Mounted in the body 2 of the valve is a spider 3, having a central hub portion 4 terminating near its lower end in a sleeve 5, from which extends a depending annular skirt 6.

A portion of the sleeve 5 forms a sliding fit within the hub 4 of the body 2, and above it is an extended flange 7, seating on a gasket 8 carried by a shoulder formed in the body 6 to receive it. Inside of the skirt 6 is a stepped portion forming an abutment 9, and a further stepped portion which, when the parts are assembled, forms an annular recess 11 inside of sleeve 5.

At its upper end, the spider 3 is formed with an annular cylinder bushing 12, which has a sliding fit within the body 2, and is clamped in place by a head or cover plate 13. This head or cover plate is separated from the top of bushing 12 and body 2, by a sealing gasket 14 which serves to produce a tight joint between the head and both the body 2 and the bushing 12. The pressure transmitted through the spider, when head 13 is secured in position, is exerted on the gasket 8, thereby producing a tight seal between the flange 7 and the valve body 2. This sealing action is improved because of the fact that bushing 12, spider 3, and sleeve 5, form one single integral structure. This integral structure also facilitates dismounting of the valve parts as the entire assembly is carried by the spider.

Mounted for sliding movement in a base within the hub 4, is a valve stem 15 of the main feed valve 23. This stem carries near its top end a cup washer 16 secured in place by a stem clip 17, held in groove 18. This cup washer engages a spring 19 and holds it under compression, one end of the spring engaging the spider and the other, the under side of the cup washer, the action being to bias the valve stem 15 to its extreme upper limit of movement, and to hold the feed valve open positively at all times, except when it is controlling pressure.

The bore of hub 4 in which the valve stem 15 moves, contains an annular baffling groove 21 which tends to trap oil collected from the valve stem, and to prevent it from passing to the piston chamber. The lower end of valve stem 15 has a reduced portion 22, which is of less diameter than the diameter of the bore of hub 4, so that in the extreme upward position of valve stem 15, an annular chamber is formed between the reduced portion 22 of stem 15 and the guide in which it moves.

Consequently, if oil is deposited on and gums on the lower end of the stem which is exposed when the valve is closed, it cannot build up to a sufficient height to interfere with the free movement of the stem up and down, because the built-up portion will move in the clearance afforded between the reduced portion 22 and the stem guide. This action is further increased by the presence of the annular recess 11 in which dirt and gummy oil can collect, without causing appreciable friction against the valve stem.

Depending from the lower end of valve stem 15, and capable of pivotal movement with respect thereto, is a valve 23 formed preferably of stainless steel, or other non-corrosive metal, having a smooth polished lower surface for engagement with a valve seat 26. This valve 23 is secured to the valve stem by a pivot pin 24, held in position by a snap ring 25 which rests in a groove encompassing the valve seat. By removing the snap ring, pin 24 is rendered accessible for removal of the valve 23 for repair or inspection.

It will be observed that in the extreme upper limit of movement of valve 23, its upper surface engages the abutment 9 on sleeve 5, thereby sealing the recess 11 against the entrance of dirt or other contaminating media. Likewise, in this position of the valve, its lower face is substantially flush with the lower end of depending skirt 6, so as to prevent oil or other deposit from accumulating on parts where it would prevent the complete withdrawal of the valve to open position.

Entrance of foreign matter between the valve 23 and the skirt 6 is substantially prevented by the provision of very small clearance between these parts.

The valve seat 26 is provided on a removable valve seat bushing 28 and this seat has a continuous taper 27, terminating in the sharp seat so as to ensure a positive sealing action between valve 23 and the seat. Further, this tapered surface not only gives minimum seat area, but it also acts as a deflector to free the seat of dirt and foreign substances. The removable bushing 28 is carried by a plug member 31 threaded into the valve body 2, and the chamber within which valve 23 moves is sealed by a gasket 29, with which a flange 32 on bushing 28 engages.

The parts thus far described, are so constructed and related as to make them readily removable individually or collectively for repair or inspection. For example, the member 31 may be removed at any time so as to make it possible to inspect the valve seat 26, and at the same time to ascertain the condition of valve 23. Furthermore, the construction is such as to prevent access of oil and dirt to the parts, and to prevent oil deposit contamination from interfering with the proper operation of the valve parts.

The valve stem 15 is counterbored at 33 to receive a stem 34 which is of a length sufficient to reach to the bottom of counterbore 33, but is limited in its downward movement by such engagement, thus preventing tilting or binding of the stem and bringing the stem 34 into direct thrust engagement with the valve. The stem 34 above shoulder 35 is threaded at 36, to a valve-actuating piston 37 provided with the usual sealing ring 38, which cooperates with the cylinder bushing 12, and forms a substantially leak-proof seal therewith.

As shown in the drawing, the piston 37 occupies its uppermost position in which the hub portion 39 of piston 37 engages the head or cover plate 13. As previously described, the spring 19 is under compression and, therefore, exerts an upward pull on the stem 15, holding the valve 23 in sealing engagement with abutment 9 on sleeve 5. When air pressure is supplied above the piston 37, this piston may move downward until the lower end of stem 34 engages the bottom of recess 33, at which time spring 19 is placed under further compression and stem 15 is moved downwardly, carrying the valve 23 against its seat 26.

The manner in which air is supplied to the chamber above this piston is immaterial, so far as this invention is concerned, and for a complete statement of operation, reference may be had to prior Patent #1,781,747, above referred to. For the purpose of this description, it will be sufficient to state that when it is desired to close the valve 23, fluid pressure is supplied to the chamber above the piston 37, and when it is desired to open this valve, pressure from that chamber is exhausted to atmosphere or to any suitable collecting reservoir, whereupon the valve is opened by spring 19.

From an inspection of the drawing, it will be understood that when the head 13 is removed, the piston 37 is accessible and may be lifted out freely, together with the stem 34 without interfering with the remainder of the assembly. This is particularly true of the spring 19, which is permanently secured in position by the cup washer 16 and the hub portion of spider 3. Consequently, the piston 37 may be removed for renewing the sealing ring 38, or for any purpose whatsoever, without the necessity of replacing a tensioning spring or interfering with its adjustment.

The feed valve is provided with a warning port supply check valve to indicate to the engineer when the brake valve is in "release" position, and performs the same function as valve 50 of Patent No. 1,781,747, above mentioned. When the engineer's brake valve is in release position, a warning port is open and should discharge air. The feed valve 23, however, closes when the engineer's brake valve is in release position and cuts off the supply of air. At such time, valve 47 opens and by-passes sufficient brake pipe air to operate the warning port (the chamber 57 being connected with the brake pipe). Valve 47 closes against back flow to the brake pipe during service reductions. Accordingly, the body 2 adjacent the feed valve chamber is constructed to receive a check valve body 41, threaded into the main valve body 2, as at 42, and provided with a flange 43 for limiting its inward movement. Carried by a shoulder on the main valve body, is a gasket 44 which acts with flange 43 to form a tight joint between the feed valve chamber and the exterior thereof, when the body 41 is in position. The body 41 carries a tubular extension 45, the outside of which is tapered and terminates in a sharp annular seat 46.

Cooperating with the seat 46 is a valve 47, preferably of rust-proof material, such, for example, as stainless steel, and carrying a central stem around which is placed a rubber or composition seat 48, held in place by a conical valve guide 49. The valve guide surrounds the stem of the valve and holds the seat 48 in its position against the valve. The valve is biased to its closed position by a tension spring 51, one end of which is hooked through the stem of the valve, the other end being secured to a pin 54 carried inside of a hollow threaded plug 52.

The chamber in the tubular body 45 is connected with an auxiliary chamber 57 in body 2, by a radial port or ports 53, so as to subject the valve to pressure when conditions are proper to require the operation of the check valve.

In order to prevent carbonized oil and foreign deposits from entering this valve and interfering with its seating, the entire valve is surrounded by a hollow cup-shaped shield 55, carrying a flanged extension 56 which is held between gasket 44 and flange 43. The escape of pressure fluid from the inner chamber, when the valve is opened, takes place through lateral side vents 58 in the shield 55.

The configuration of the shield 55 is such as to guide and position the valve 47 at all times, but not to prevent it from opening freely when pressure is supplied to the chamber in extension 45. Inasmuch as the only entrance to the inside of this shield is through these lateral vents 58, the entry of foreign material to the valve surfaces is blocked.

Access to this check valve may be had readily by simply removing the body 41, whereby the entire check valve assembly can be inspected and the valve surfaces reached by removing the shield 55. Furthermore, by removing plug 52, and the spring associated with it, the valve itself may be disconnected from its seat for repair and inspection.

In assembling the check valve, ample clearance is provided between the shield 55 and the annular skirt 6, so that the passage of pressure fluid is not impeded, although the passageways are sufficiently irregular and devious to prevent the entrance of dirt and foreign material to the valve seat. This result is not only brought about by the provision of shield 55 and the particular type of check valve cooperating with it, but the relation between this check valve assembly and the protecting skirt of the valve 23 is such as to prevent foreign material from being blown from one of these parts to the other.

Although the structure herein shown and described has been designated as the preferred form of the invention, no limitations are intended to be placed on the scope of the invention, other than those expressed in the following claims.

What is claimed is:

1. In a valve structure, the combination with a valve body having a valve stem guide therein, of a valve stem movably mounted in said guide; a valve on said stem; a spring for biasing said valve stem to the open position of the valve; a piston freely movable in one direction independently of said valve stem and valve, but capable of moving said stem to valve-closing position by direct thrust engagement with said valve at a point between said guide and the seating face of the valve; and means for securing said spring in permanent thrust relation to said stem.

2. The combination of a valve body; a valve therein having a tubular stem; an elongated tubular guide for the stem; a cylinder; a piston in said cylinder; a rod connected with the piston and extending within said stem into direct thrust relation with the valve at a point between the guide and the seating face of the valve; a spring for holding said valve in open position and sustaining the weight of said piston, valve and stem; and means for securing said spring to said valve stem below and independently of said piston.

3. The combination of a valve body; a spider therein, said spider comprising an integrally formed cylinder and valve stem guide; a piston in said cylinder; a valve in said body, said valve having a tubular stem movably mounted in said guide; a rod connected with said piston and extending within said stem into thrust relation with said valve; a spring for sustaining the weight of said piston and stem, and for biasing said valve to open position; and means for holding said spring in compressed relation to said stem and permitting removal of said piston from the cylinder without disturbing said spring.

4. In a valve structure, a valve body having a valve stem guide therein; a valve stem carrying a valve, said stem being movable in said guide, and having an outer reduced portion which is wholly exposed in the closed position of said valve, but is shielded by said guide and held in spaced relation thereto in the open position of the valve; means for biasing said valve to open position; and piston-operated means for closing said valve.

5. In a valve structure, a valve body; a spider mounted in said body, said spider including an integral cylinder and valve stem guide; an annular skirt depending from said spider below said guide; a valve stem movable in said guide; a valve on said stem; a piston in said cylinder for closing said valve; and spring means for withdrawing the valve from its seat into abutting relation with said guide within said skirt.

6. In a valve structure, a valve body; a spider mounted in said body, said spider including a cylinder and a valve stem guide formed integrally; a valve stem movable in said guide, said stem having its lower end reduced in cross section; a valve on said stem adjacent said reduced portion; a depending skirt on said guide for shrouding said valve in its open position; a piston in said cylinder for closing said valve and exposing the reduced portion of the valve stem below the guide; and spring means for moving said valve to open position in which it abuts said guide within said skirt.

7. A feed valve structure comprising a hollow valve body; a spider in said body, said spider including an integral cylinder and valve stem guide, and an annular skirt depending below said guide; a valve stem movable in said guide; a valve head carried by said stem below said guide and arranged to be retracted within said skirt against said guide when the valve is open; spring means for opening said valve; and a piston in said cylinder for closing said valve.

8. In a feed valve, a valve body containing a valve chamber, a piston chamber and an auxiliary chamber; a valve in said valve chamber; means responsive to elevated pressures in said piston chamber for closing said valve; means for shielding said valve from contaminating media; a check valve between the auxiliary chamber and the valve chamber for preventing flow of air from said valve chamber to said auxiliary chamber and allowing flow of air from said auxiliary chamber to said valve chamber whenever the pressure in said auxiliary chamber predominates; and shielding means surrounding said check valve.

9. In a feed valve structure, a valve body containing at least two chambers; a plug in said body, said plug carrying a tubular extension connecting said chambers and terminating in a sharp annular valve seat, said extension being in communication with one of said chambers; a valve engaging said annular seat; a tension spring for biasing said valve to closed position; and a tubular shield surrounding said valve and extension and containing lateral pressure fluid discharge ports communicating with the other of said chambers.

10. In a feed valve for air brakes, a check valve, including a valve seat and a valve head; spring means for biasing said valve to closed position; a conical guide for said valve head, said spring means being attached to said head within said seat and spaced therefrom; and a tubular protective shield surrounding said valve structure, said shield containing pressure fluid discharge openings.

11. In a feed valve structure for air brakes, a hollow valve body; a feed valve within said body; means for operating said feed valve; a check valve located adjacent said feed valve for supplying warning port air; means for shielding said feed valve from contamination when the valve is open; and a shield surrounding said check valve and operating to protect it in both its open and its closed positions.

12. In a device of the class described, the combination of a valve body; a valve therein having a tubular stem; an elongated tubular guide for the stem; an actuating rod for said valve extending within said stem and substantially through the entire length of the guide into thrust relation with the valve at a point between said guide and the seating face of the valve; and a biasing means connected directly to said stem independently of said rod.

CHARLES A. CAMPBELL.